Aug. 2, 1949.  C. W. WALZ  2,477,707
SELF-UNLOADING VEHICLE
Filed April 27, 1946  2 Sheets-Sheet 1

INVENTOR.
CLAUDE W. WALZ
BY
ATTORNEYS.

Aug. 2, 1949.   C. W. WALZ   2,477,707
SELF-UNLOADING VEHICLE
Filed April 27, 1946   2 Sheets-Sheet 2
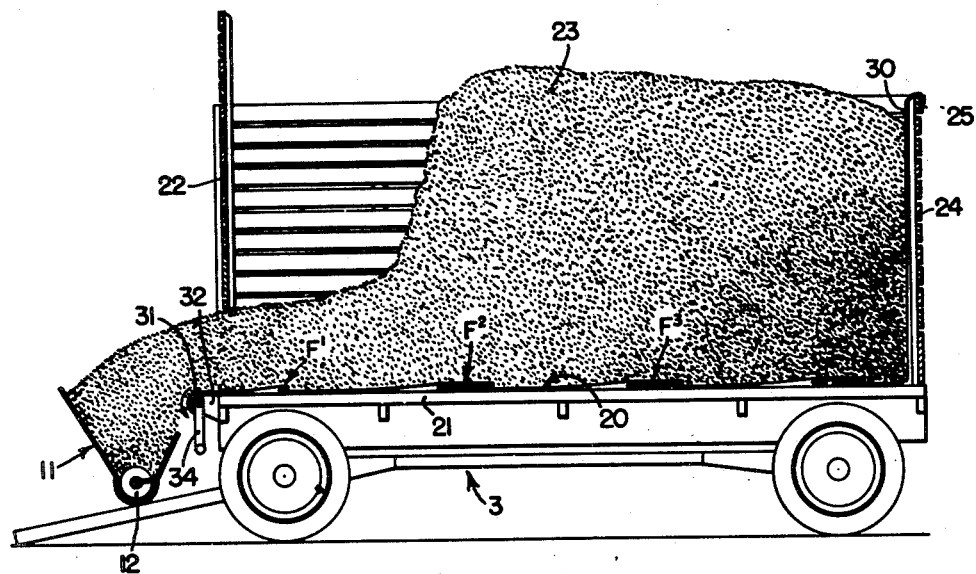
FIG. 3
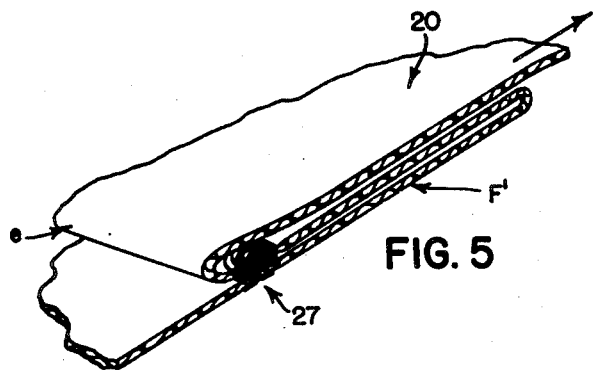
FIG. 5
INVENTOR.
CLAUDE W. WALZ
ATTORNEYS Patented Aug. 2, 1949

2,477,707

UNITED STATES PATENT OFFICE 2,477,707

SELF-UNLOADING VEHICLE

Claude W. Walz, Rock Island, Ill., assignor to Deere & Company, Moline, Ill., a corporation of Illinois Application April 27, 1946, Serial No. 665,448

6 Claims. (Cl. 214—83.34)

1

The present invention relates generally to material-handling means and more particularly is concerned with farm equipment having to do with loading and unloading of fibrous materials, such as chopped hay, grass, legume, cereals, and other crops and similar material.

The object and general nature of the present invention is the provision of new and improved means and methods for handling crop materials, such as the crops referred to above, in a simple and expeditious manner. More specifically, it is one feature of this invention to provide an improved means and method for unloading such materials as chopped hay and other crops whereby such materials may be unloaded from a wagon, trailer or the like in a steady and uniform manner so as to facilitate the feeding of such material into a blower or the like for directing the material into a silo or other point of storage. Further, it is a feature of this invention to provide new and improved means and methods whereby such material may be fed or unloaded into a blower or subsequent crop-handling apparatus in relatively small successively shifted increments so that, during such unloading or feeding, the entire mass of the load on the wagon, trailer, or the like, need not be shifted at one time.

These and other objects and advantages of the present invention will be apparent to those skilled in the art after a consideration of the following detailed description, taken in conjunction with the accompanying drawings in which the preferred means and method for carrying out the principles of the present invention have been shown by way of illustration.

In the accompanying drawings:

Figure 3 is a view taken generally along the line 3—3 of Figure 2.

Figure 5 is a fragmentary detail view showing one means providing for the desired folded or overlapped portions in the unloading strip when installing the latter or preparing to install the latter in position in the wagon, trailer, or the like so as to receive the material as it is harvested and/or loaded.

2

Figure 1:
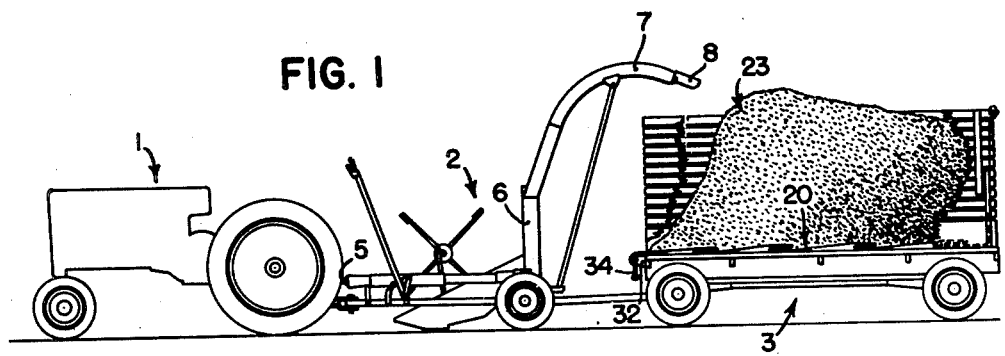
Figure 1 is a general side view illustrating the harvesting and/or loading of the crop material.

Referring now to the drawings, Figure 1 illustrates an agricultural outfit of the type commonly employed in harvesting, handling and hauling field chopped hay, grass, and other crops whereby with a tractor, a field chopper, and a wagon or trailer, the crop may be cut, chopped and loaded into a wagon or trailer in one operation across the field. In Figure 1, the tractor is indicated by the reference numeral 1, the field chopper by the reference numeral 2 and the wagon or trailer by the reference numeral 3. The tractor 1 may be of conventional construction, preferably of the type having a power takeoff shaft 5 by which the field chopper 2 may be driven. The latter implement may be provided with a cutter bar for cutting the crop to be chopped or with a pickup device for picking up material, such as hay, that has been previously cut and windrowed. Normally, the wagon or trailer 3 is hitched so as to be pulled behind the field chopper 2. In operations of this kind, the field chopper 2 includes a cutter or cutters, knives or the like, which cut or chop the crop into short lengths of a few inches or less in length, and is provided with a blower 6 or other means for delivering the chopped material into the wagon or trailer 3. Preferably, the blower 6 delivers the material upwardly and rearwardly through a chute 7, the rear end of which includes a controllable deflector 8 which can be adjusted so as to deliver the material placed into the rear portion of the wagon or trailer 3 and then distributed in the more forward portions of the wagon or trailer as the latter is loaded. After the loading of the wagon or trailer has been completed, the same is hauled up to a blower 10 (Figure 2), which is normally a stationary machine, and elevated or discharged into a silo, barn, stack or other point of storage. The present invention is more particularly concerned with the handling of the loaded material with particular reference to the unloading and delivering of the material from the wagon or trailer into the blower 10. Conventionally, the unit 10 includes a receiving conveyor 11, sometimes including an auger 12, which delivers material discharged thereinto toward the blower or elevating part of the unit 10. The receiving hopper section 11 is arranged so as to be swung upwardly into an operative position, as indicated in dotted lines in Figure 2, so as to provide for driving the wagon or trailer up into a position so that, when the hopper 11 is swung downwardly into an operative position, the material in the wagon or trailer may readily be discharged into the hopper.

Figure 4:
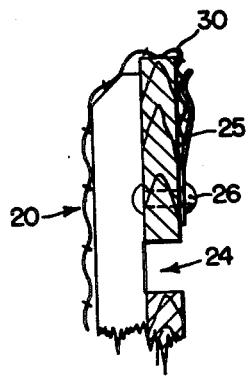
Figure 4 is a fragmentary sectional view illustrating one preferred means for releasably holding one end of the unloading strip in position during the loading operation.

To facilitate the unloading of the material, such as chopped hay, grass, silage, or other crop, there is provided, according to the principles of the present invention, an unloading strip 20 of flexible material, such as canvas or the like. The strip 20 is of material length, specifically, materially longer than the length of the body of the wagon or trailer and the height on the rear end thereof. As best shown in Figure 3, the wagon or trailer 3 includes a bottom 21, a front endgate 22, sides 23, and a rear endgate 24. The front endgate 22 may be raised into different positions, as indicated in Figure 3. The rear endgate 24, at the upper portion thereof, is provided with one or more spring clips 25, anchored to the end 24 by rivets 26 or the like, and the rear end 30 of the flexible strip 20 is adapted to be releasably engaged underneath the spring clips 25, as best shown in Figure 4, before the loading or harvesting, as shown in Figure 1, is begun. The elongated strip 20 is adapted to be laid along the bottom 21 of the wagon or trailer in folded or overlapping relation, and to this end along each margin of the strip 20 a plurality of snap fasteners 27 or other suitable means is installed. This permits the operator to lay the strip 20 along the bottom of the wagon or trailer gathered into transverse folds and releasably held in that position by the snap fasteners, as indicated in Figure 5. Such fasteners are not absolutely necessary since the strip 20 may merely be gathered in folds of various sizes and degrees and in more or less an indeterminate fashion, so long as an appreciable length of additional material, over and above the actual length of the wagon box or trailer body, is provided. The front end of the strip 20 is adapted to be engaged in any suitable manner with a roller 31 that is mounted for rotation in brackets 32 carried at the front end of the vehicle 3, the roller 31 being adapted to be rotated in the direction of the arrow shown in Figure 3 by any suitable means, such as a crank and/or gearing, indicated at 34.

Figure 2:
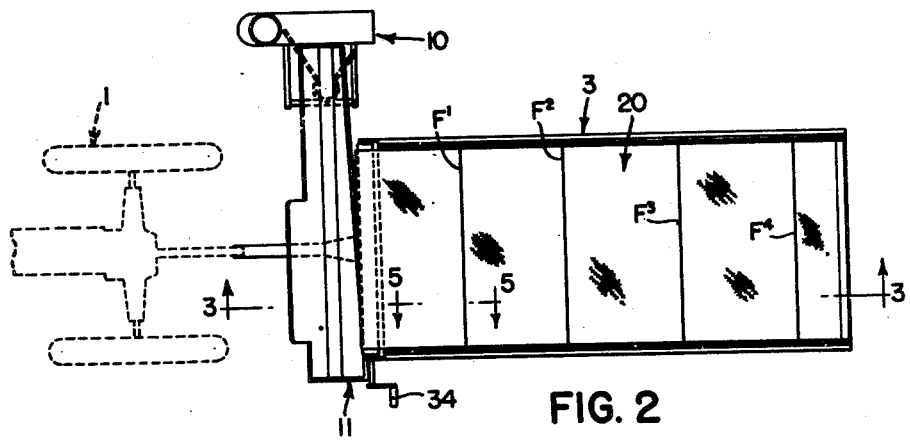
Figure 2 is an enlarged fragmentary plan view showing the unloading of the crop material into a blower or other apparatus for subsequent handling and/or treatment of the crop material.

With the front endgate 22 lowered, and the unloading strip 20 arranged in folded relation, as described above, the outfit is driven across the field, as shown in Figure 1, with the chopper 2 discharging the chopped crop first into the rear end of the wagon or trailer, and then forwardly thereof as the latter becomes filled. From Figure 1 it will be seen that the engagement of the rear end of the strip 20 with the spring fingers 25 holds the strip up against the rear end of the container body in such a manner that the blast of air and/or material against the lower rear corner of the container will not inadvertently or accidentally draw the rear end of the strip out of position. As the chopped material is delivered into the wagon or trailer it settles down upon the folded portions of the strip during the loading, and after the loading is completed the wagon or trailer is driven up to the hopper or receiver 11 of the blower unit 10, as indicated in Figures 2 and 3.

The operator then raises the front endgate 22 so as to provide for the discharge of material. The unloading of the material from the wagon or trailer is accomplished by turning the crank of the roller-driving mechanism 34 in the proper direction to wind up the strip 20 on the roller 31. As best shown in Figure 3, during this action, the forwardmost fold, shown at F¹, will first be drawn up, which unloads a forward portion or increment of the crop from the wagon or trailer into the hopper but without causing any movement of the other and major portion on the load. After the fold F¹ has been extended and the material resting on the rear portion of the strip delivered into the hopper 11, the tension in the strip 20 as the roller 31 continues to be rotated causes the next forwardmost fold F² to be unfolded. This withdraws from the mass of crop material on the wagon or trailer the next increment of crop so that it follows the first increment in a steady and uniform manner into the hopper 11. When the fold F² is straightened out the next fold F³ is withdrawn, and the third increment of material is then drawn into the hopper 11. Preferably, the front endgate 22 is adjusted vertically so that it serves to smooth out the discharge of the successive increments and prevent any sudden overloading of the conveying means in the hopper 11. Eventually, all of the folds in the strip 20 are pulled out, as the end of the unloading operation is approached, and lastly the rear end of the strip 20, as the roller 31 is rotated, is drawn away from the spring clips 25. The fact that the rear end of the strip 20 is up to this time held against the upper portion of the rear endgate, assures that by the time the rear end of the strip 20 approaches the roll 31, all of the material from the wagon or trailer will be delivered into the hopper 11. To prepare the wagon or trailer for the next loading operation, all that it is necessary to do is to pull the rear end of the strip 20 rearwardly, unrolling the strip from the roll 31, gather the strip 20 into the folds F¹, F², F³, etc., using the snap fasteners 27 or other means, or simply gathering the material into folded and/or overlapped sections as may be desired, and then fasten the rear end of the strip 20 under the clips 25, as shown in Figure 4. If desired the front end of the strip 20 may be engaged in the clips 25 before the folds along the bottom are formed. As best shown in Figure 3, the folds preferably are arranged so that the folded section underlies the portion of a canvas on which the load rests. Then as the front end of the strip is pulled forwardly, in the direction of the arrow shown in Figure 5, all of the crop resting on the upper folded portion is brought forwardly in a smooth and uniform manner, additional masses of the crop also being pulled forwardly as the rear edge, indicated by the reference character E in Figure 5, is unfolded in a forward direction thereby bringing underlying portions of the fold up into engagement with the crop. The operator may provide as many folded sections as may be desired or necessary, and the extent or amount of material included in each fold may also vary as desired, depending on the particular type of crop being handled, the rate at which it is desired that it should be fed into the hopper or otherwise discharged from the wagon or trailer, and other conditions. When handling such material as chopped hay, also other crops such as silage, it is usually preferable to remove the front endgate 22, but it may be left in place, if desired, raising the same to such a point that the uniform and steady flow of material is accommodated. When handling materials which flow more freely, such as grain, lime and other materials, it may be preferable to position the front endgate 22 in such a position, as shown in Figure 3, but the flow or discharge of material is controlled, in some measure, at least, by the position of the endgate. The idea of unloading from the front of the trailer, especially where the material is originally loaded into the trailer or wagon by a rearwardly discharging apparatus, such as the hay chopper 2, shown in Figure 1, it is especially advantageous. Tests have shown that crops, such as chopped hay and the like, flow much more readily and smoothly when unloaded from the front end, rather than the rear end, and it is presently thought that this possibly arises from two causes. First, material such as chopped hay and the like when delivered into the wagon in the manner shown in Figure 1, appears to be laid down into the wagon in such a manner that when an attempt is made to unload the material from the rear end, such material does not flow readily but, instead, appears to cling together and resist being removed from the wagon. Actually, at times, when unloading from the rear end, two men are required to fork the chopped hay or other material away from the mass of material in the wagon or trailer, with the result that feeding is non-uniform and overloading the blower 10 frequently occurs. Second, when the wagon or trailer is loaded in the manner shown in Figure 1, the material in the rear portion of the body appears to be compacted and rather closely intertangled so that for this reason also the material does not flow readily from the rear end of the unit, whereas when the unloading is accomplished from the front end, the material last delivered into the wagon or trailer is the first to be discharged and is free to flow uniformly and steadily from the wagon box, and very little if any forking is required. Especially is this true where the unloading is accomplished by means of an unloading strip of flexible material arranged in the body of the wagon in folded or gathered condition, since the progressive unfolding and straightening out of the unloading strip materially facilitates the separation of the loaded crop material into successively shifted increments or masses, and being broken up thusly into relatively small parts or portions, the material flows easily, smoothly and uniformly into the blower hopper 11.

While I have shown and described above the preferred means and methods for carrying out the principles of the present invention, it is to be understood that my invention is not to be limited to the particular details shown and described above, but that, in fact, widely different means may be employed in the practice of the broader aspects of my invention.

What I claim, therefore, and desire to secure by Letters Patent is:

1. An unloading vehicle comprising a body having front and rear ends, a strip of flexible material substantially longer than the length of the bottom of said body, means on the upper portion of one end of said body to releasably receive one end of said strip, the latter being of such length that one end of the strip may be engaged in said strip-receiving means, the strip laid along the bottom and gathered into overlapping or folded portions, and the other end of the strip may be positioned accessibly at the other end of said body, said strip having a width substantially the same as the width of said body so as to underlie and support material loaded into said body, and means at the other end of said body connectible with said other end of said strip for withdrawing the strip so as to progressively unload the portions of the material carried on said strip between the folded portions and on the upper sections of the folded portions by removing the material from the body in successive portions.

2. An unloading vehicle comprising a body having front and rear ends, the front end including a raising endgate, a strip of flexible material substantially longer than the length of the bottom of said body and the height of the rear end, means on the upper part of said rear end to releasably receive the rear end of said strip, the latter being of such length that the rear end of the strip may be engaged in said strip-receiving means, the strip laid along the bottom and gathered into overlapping or folded portions, and the front end of the strip may be positioned accessibly at the front end of said body, and means at the front of the body adjacent the raising endgate engageable with the front end of said strip for withdrawing the strip so as to progressively unload said body by removing the material therein in successive portions under the front endgate.

3. In an unloading vehicle having a bottom, front and rear ends, an endgate at one end, and strip-receiving means on the upper part of said endgate, an unloading strip materially longer than length of said bottom and the height of said endgate, said strip being of such length that one end may be engaged in said strip-receiving means, the strip laid along the bottom and gathered into overlapping or folded portions, and the other end of the strip may be positioned accessibly at the other end of said body, whereby the strip may be withdrawn by pulling on said other end so as to progressively unload said vehicle in successively shifted increments as the folded portions of said strip are successively pulled out of their folded position.

4. In vehicle-unloading apparatus, an elongated strip adapted to be laid along the bottom of said vehicle with longitudinally spaced transversely extending folds therein, said strip being substantially the width of the bottom of the vehicle, and disengageable means carried on spaced apart portions of said strip for defining said folded portions.

5. The combination with an unloading vehicle adapted to receive material to be unloaded therefrom, said vehicle having releasable strip-receiving means at one end and strip-winding means at the other end, of an elongated strip of flexible material, having a length materially greater than the distance between said two strip-receiving means, whereby said strip may be connected with said releasable strip-receiving means and then laid along the bottom of said vehicle in overlapping or folded relation, so that when said strip-winding means is actuated to withdraw the strip from the vehicle and disengage it from said first strip-receiving means, the material in said vehicle is withdrawn therefrom in successive increments due to the unfolding of the folded portions of said strip without having to shift the entire mass of the material in said vehicle at any one time.

6. In apparatus for handling chopped hay, grass, silage and the other crop material, a wagon adapted to be trailed behind a field hay chopper or the like having means adapted to discharge the chopped material rearwardly into the wagon, the latter having a body for receiving said crop material and having a rear endgate and a front end from which said material is adapted to be unloaded, a strip of longitudinal shiftable flexible material lying in the bottom of said body and having a rear end extended upwardly to the upper portion of said rear endgate, resilient gripping means on the upper part of the rear endgate to releasably engage the rear end of said flexible strip for holding the latter in position during the loading of the wagon, and means adjacent the front end of said body and engaged with the front end of said flexible strip for drawing the flexible strip and the crop material in the body forwardly for unloading said crop material out of the front end of the wagon.

CLAUDE W. WALZ.

REFERENCES CITED

The following references are of record in the file of this patent:

UNITED STATES PATENTS

| Number | Name | Date |
|---|---|---|
| 766,866 | Bendickson | Aug. 9, 1904 |
| 2,129,796 | Swift | Sept. 13, 1938 |
| 2,321,168 | Tognetti | June 8, 1943 |
| 2,407,430 | MacRae | Sept. 10, 1946 |

FOREIGN PATENTS

| Number | Country | Date |
|---|---|---|
| 527,916 | Great Britain | Oct. 18, 1940 |